Nov. 6, 1934.        P. A. JANSSENS        1,979,940
CAKE DRIER
Original Filed Sept. 16, 1932
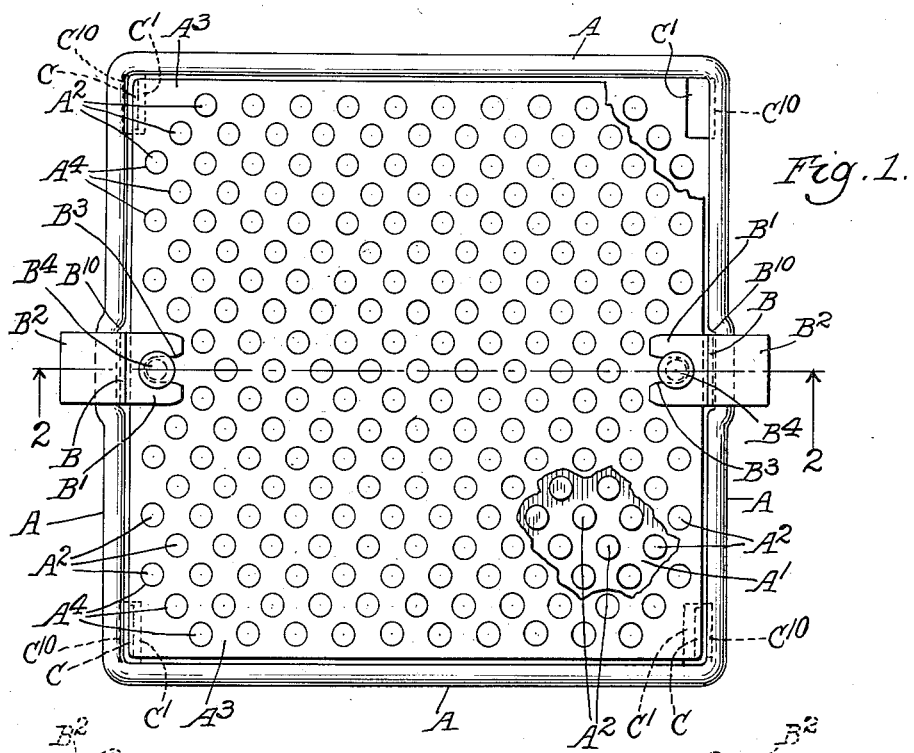
Fig. 1.
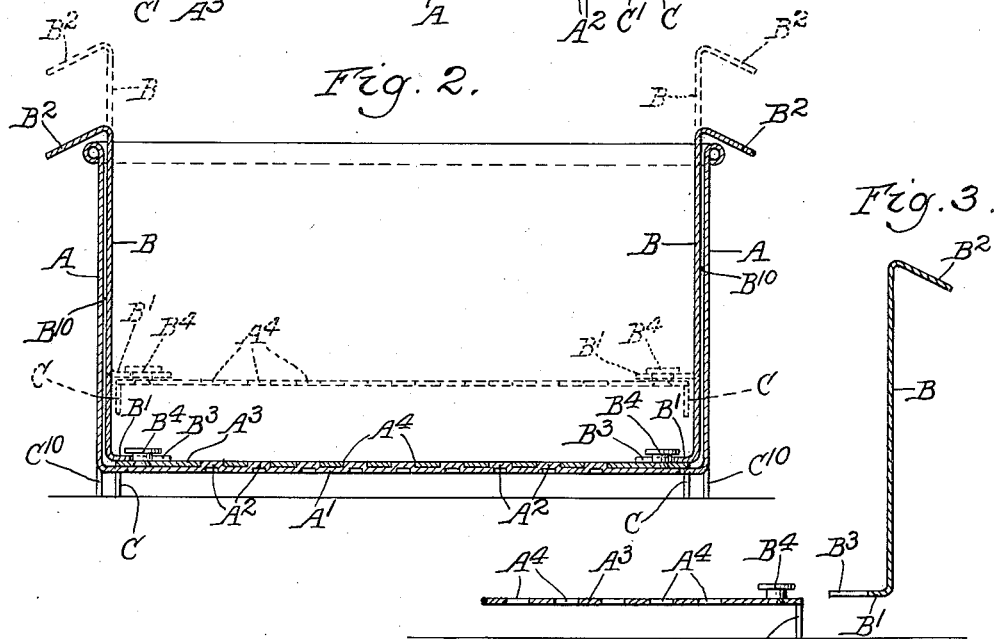
Fig. 2.
Fig. 3.
Inventor
Peter A. Janssens
by Parker & Carter
Attorneys.

Patented Nov. 6, 1934

1,979,940

UNITED STATES PATENT OFFICE 1,979,940

CAKE DRIER

Peter A. Janssens, Chicago, Ill.

Original application September 16, 1932, Serial No. 633,529. Divided and this application February 1, 1934, Serial No. 709,364

12 Claims. (Cl. 53—6)

My invention relates to an improvement in cooking devices and is shown in connection with an improvement in cake coolers. One object is the provision of a cooking container for a cake which shall be particularly efficient in cooking the cake. Another object is the provision of a cake cooking utensil which shall be effective to permit ready and efficient cooling of the lower part of the cake. Other objects will appear from time to time in the course of the specification and claims.

The present application is a division of my application No. 633,529 for a Cake drier, filed September 16, 1932.

I illustrate my invention more or less diagrammatically in the accompanying drawing, wherein—

Figure 1 is a top plan view;

Figure 2 is a section on the line 2—2 of Figure 1; and

Figure 3 is a detail section showing parts removed from the pan and separated.

Like parts are indicated by like symbols throughout the specification and drawing.

Referring to the drawing, I illustrate a solid flat bottom rectangular pan having side members A and a solid bottom member $A^1$, which is illustrated with upward projections $A^2$. Superposed on the bottom member $A^1$ is the false bottom $A^3$ provided with apertures $A^4$ which are adapted to receive the projections $A^2$. In order to raise and lower this upper or false bottom, I provide lifting elements B each with a lower horizontal portion $B^1$ and an upper outwardly extending portion $B^2$. The portions $B^2$ may be positioned at such a height above the false bottom $A^3$ as to permit the false bottom to rest in the position in which it is shown in Figure 2. The lifting member B may have its horizontal lower portions $B^1$ slotted or apertured as at $B^3$ to receive studs $B^4$ which are positioned upon or project upwardly from the false bottom $A^3$. The user, when the false bottom is lifted, can readily free the lifting members B from the false bottom and from the cake. Note that the members B fit into indentations $B^{10}$ in the sides A of the pan, whereby they do not affect or mar the shape of the cake.

It will be realized that whereas I have described and shown a practical and operative device, nevertheless many changes might be made in the size, shape, number and disposition of parts without departing from the spirit of my invention. I therefore wish my description and drawing to be taken as in a broad sense illustrative and diagrammatic rather than as limiting me to my specific showing.

The use and operation of my invention are as follows:

In baking a cake, it is desirable, of course, that the bottom and sides of the cake be subjected directly to the metal of the pan so that the heat from whatever source is employed will readily penetrate the pan and reach the cake. However, it is also important to be able readily to remove the cake from the pan without the necessity of cutting the cake out of the pan and without the necessity of employing oil paper or some equivalent material for preventing the adhesion of the cake to the bottom of the pan. It is, of course, easy to separate the top of the cake from the side of the pan, as by the employment of a knife or blade.

My invention solves the problem of separating the bottom of the cake from the pan.

In operation, the false bottom $A^3$ is inserted in the position in which it is shown in Figure 2 and the lifting device B is applied to it. The pan is then filled in the usual manner and the cake baked. After the cake has been removed from the oven and the cook wishes to remove the cake from the pan, she has only to loosen the sides of the cake from the pan and then lift the false bottom with the cake on it. The cake can then be placed upon any suitable support or surface and the lifting members B are readily removed by simply sliding them laterally from beneath the cake. The bottom portions $B^1$ of the lifting members and, of course, the studs with which they interpenetrate, will cause an indentation in the bottom of the cake but this will not be apparent or damaging because it is on the cake bottom. The members B or the portions $B^2$ will not affect the shape of the cake because, as is clear from Figure 1, they seat in concavity in the pan.

In order to support the perforated false bottom clear of any supporting surface upon which it is positioned, I provide ears or lugs C at each corner thereof which may penetrate through apertures $C^1$ in the bottom $A^1$ when the parts are in the position in which they are shown in Figure 2. In order to hold the bottom $A^1$ and the false bottoms $A^3$ in contact, I provide supports $C^{10}$ which may be, for example, at the corners of the main outer pan A or its bottom $A^1$. Thus, the cake, still in position on the false bottom, may be lifted from the pan and placed upon any suitable supporting surface and the member C will space the false bottom upwardly from the supporting surface and permit the access of air to the bottom of the cake.

I claim:

1. In a cake drier, a circumferential side member and a compound bottom member, said bottom member including an upper portion provided with a plurality of apertures and a lower portion provided with projections penetrating said apertures, said lower portion being permanently attached to the side member, said upper portion being readily removable upwardly from the lower portion.

2. In a cake drier, a side pan element, and a compound bottom therefor, said bottom including a member provided with a plurality of apertures and a member including interpenetrating portions filling and closing said apertures, and means for separating the two members of said compound bottom.

3. In a cake drier, a side pan element, and a compound bottom therefor, said bottom including a member provided with a plurality of apertures and a member including interpenetrating portions filling and closing said apertures, and means for separating the two members of said compound bottom, said means being associated with the cake drier.

4. In a cake drier, a circumferential side member and a compound bottom therefor, said bottom including an element provided with a plurality of apertures, and an element including interpenetrating portions filling and closing said apertures, and means for separating the two elements of said compound bottom member, said separating means being associated with the cake drier.

5. In a cake drier, a side member and a compound bottom therefor, said bottom including an element provided with a plurality of apertures and an element including interpenetrating portions filling and closing said apertures, and means for separating the two elements of said compound member, said means being removably associated with one of said elements.

6. In a cake drier, a side member and a compound bottom therefor, said bottom including an element provided with a plurality of apertures and an element including interpenetrating portions filling and closing said apertures, and means for separating the two elements of said compound member, said means being removably associated with one of said elements, and extending upwardly therefrom to a level above the upper edge of the side member.

7. In a cake drier, a side member and a compound bottom therefor, said bottom including an element provided with a plurality of apertures and an element including interpenetrating portions filling and closing said apertures, and means for separating the two elements of said compound member, said means being removably associated with one of said elements and extending upwardly therefrom to a level above the upper edge of the side member, and outward handle extensions therefor extending outwardly above and beyond the side member.

8. In a cake drier, a side member and a compound bottom therefor, said bottom including an element provided with a plurality of apertures and an element including interpenetrating portions filling and closing said apertures, and means for separating the two elements of said compound member, said means being removably associated with one of said elements and including portions extending upwardly along the inner face of the side member, the side member being indented to receive it.

9. In a cake drier, a side member and a compound bottom therefor, said bottom including an element provided with a plurality of apertures and an element including interpenetrating portions filling and closing said apertures, and means for separating the two elements of said compound member, said means being removably associated with one of said elements and including a portion extending beneath the cake.

10. In a cake drier, a circumferential side member and a compound bottom member, said bottom member including an upper portion provided with a plurality of apertures and a lower portion provided with projections penetrating said apertures, said lower portion being permanently attached to the side member, said upper portion being readily removable upwardly from the lower portion, said upper portion being provided with additional spacing members adapted to space it above whatever supporting surface it is positioned upon.

11. In a cake drier, a circumferential side member and a compound bottom member, said bottom member including an upper portion provided with a plurality of apertures and a lower portion provided with projections penetrating said apertures, said lower portion being permanently attached to the side member, said upper portion being readily removable upwardly from the lower portion, said upper portion being provided with additional spacing members adapted to space it above whatever supporting surface it is positioned upon, the lower portion being apertured to permit the penetration therethrough.

12. In a cake drier, a circumferential side member and a compound bottom member, said bottom member including an upper portion provided with a plurality of apertures and a lower portion provided with projections penetrating said apertures, said lower portion being permanently attached to the side member, said upper portion being readily removable upwardly from the lower portion, said upper portion being provided with additional spacing members adapted to space it above whatever supporting surface it is positioned upon, said lower portion being provided with spacing means of sufficient height to permit the upper and lower portions to abut and interpenetrate when the two are nested together.

PETER A. JANSSENS.